United States Patent
Pauly

(10) Patent No.: US 6,571,171 B1
(45) Date of Patent: May 27, 2003

(54) METHOD AND APPARATUS FOR GRAPHICALLY INSERTING WAYPOINTS FOR A FLIGHT MANAGEMENT SYSTEM

(75) Inventor: Martin Pauly, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 09/391,779

(22) Filed: Sep. 8, 1999

(51) Int. Cl.[7] .......................... G01C 21/00; G01S 1/02; G06F 9/50; G06F 13/00; G06F 17/00; G06F 19/00; G06F 165/00

(52) U.S. Cl. ................. 701/206; 701/207; 701/209; 701/210; 701/11; 701/4; 701/202; 701/99; 701/221; 701/123; 345/427; 345/428; 345/856; 345/1.3; 244/3.15; 244/234; 244/182; 244/186; 244/220; 244/175; 342/13; 342/16; 342/401

(58) Field of Search ................. 701/206, 207, 701/209, 210, 3, 11, 4, 202, 23, 14, 201, 120, 16, 99, 221, 123, 5, 218, 121; 340/975, 970, 974, 945, 973, 951, 977, 948, 976, 990, 500, 961; 345/427, 428, 856, 1.3; 244/3.15, 234, 182, 186, 220, 175, 192, 179, 193, 75 R, 180, 178; 342/401, 13, 16

(56) References Cited

U.S. PATENT DOCUMENTS

| | | | | |
|---|---|---|---|---|
| 4,642,775 A | * | 2/1987 | Cline et al. ................. | 364/443 |
| 5,978,715 A | * | 11/1999 | Briffe et al. ................. | 701/11 |
| 6,057,786 A | * | 5/2000 | Briffe et al. ................. | 340/975 |
| 6,112,141 A | * | 8/2000 | Briffe et al. ................. | 701/14 |

OTHER PUBLICATIONS

Co-pending application, Docket No. 99CR106/KE, entitled "Method and Apparatus For Interactively Selecting Display Parameters For An Avionics Flight Display" by Sarah Barber, Norm W. Arons, and George W. Palmer.

Co-pending application, Docket No. 99CR107/KE, entitled "Method and Apparatus For Interactively Selecting Controlling and Displaying Parameters For An Avionics Radio Tunign Unit" by George W. Palmer, Claude Eyssautier, and Martin Pauly.

Co-pending application, Docket No. 99CR108/KE, entitled "Method and Apparatus For Interactively Displaying A Route Window For A Flight Management System" by Gary L. Owen, Sarah Barber, and George W. Palmer; and.

Co-pending application, Docket No. 99CR113/KE, entitled "Method And Apparatus For Interactively And Automatically Selecting, Controlling And Displaying Parameters For An Avionics Electronic Flight Display System" by Martin Pauly.

* cited by examiner

Primary Examiner—William A. Cuchlinski, Jr.
Assistant Examiner—Ronnie Mancho
(74) Attorney, Agent, or Firm—Nathan O. Jensen; Kyle Eppele

(57) ABSTRACT

An apparatus and method for inserting a waypoint into a preexisting flight plan which includes selecting a waypoint on a graphical display of a portion of the flight plan and automatically generating a proposed changed flight plan based upon inserting the waypoint into the nearest leg of the flight plan.

12 Claims, 2 Drawing Sheets

METHOD AND APPARATUS FOR GRAPHICALLY INSERTING WAYPOINTS FOR A FLIGHT MANAGEMENT SYSTEM

CROSS REFERENCE TO RELATED PATENT APPLICATIONS

This application is related to the below listed co-pending patent applications which are filed on even date herewith, are assigned to the same assignee, and are incorporated herein in their entirety by these references:

An application entitled "Method and Apparatus For Interactively Selecting Display Parameters For An Avionics Flight Display" by Sarah Barber, Norm W. Arons, and George W. Palmer;

An application entitled "Method and Apparatus For Interactively Selecting, Controlling and Displaying Parameters For An Avionics Radio Tuning Unit" by George W. Palmer, Claude Eyssautier, and Matt Smith;

An application entitled "Method and Apparatus For Interactively Displaying A Route Window For A Flight Management System" by Gary L. Owen, Sarah Barber, and George W. Palmer; and An application entitled "Method And Apparatus For Interactively And Automatically Selecting, Controlling And Displaying Parameters For An Avionics Electronic Flight Display System" By Matt Smith and Gary L. Owen.

FIELD OF THE INVENTION

The present invention generally relates to avionics, and more particularly relates to flight management systems (FMSs), and even more particularly relates to FMS displays having a graphical user interface.

BACKGROUND OF THE INVENTION

In the past, designers of avionics displays and flight computer systems have endeavored to achieve a reduction in pilot workload. One area of concern has been the FMS, which typically requires a significant amount of "heads-down" time. This "heads-down" time occurs when the pi primary flight displays nor out the wind screen, but instead is focused upon a task in an oblique direction, such as when using a typical FXMS control display unit (CDU), which has an integrated keyboard and a textual display unit. One approach has been proposed in which a large multi-functional display, disposed in front of the pilot is used for both viewing FMS information, as well as data input through a cursor. In some prior art applications, a map display of the various legs of a flight is provided to the pilot, showing the waypoints, or flight leg end points, as well as other significant features, such as VOR navigation radio points, airports etc. If a pilot wishes to insert a waypoint into a particular leg of the flight, the desired waypoint would be highlighted by interaction with a cursor. Once the waypoint is selected, then the cursor is used to select the desired flight leg from a textual list of flight legs. While this method of picking a flight leg from a textual list is similar to well-known prior art methods of flight leg selection, it also has significant drawbacks.

During times of moderate and severe turbulence, otherwise very simple tasks can become difficult and time consuming. For example, the step of requiring a pilot to reposition the cursor to select a flight leg from a textual list of flight legs may require considerable time. Additionally, during take-off and approach, the workload on a pilot can already be extreme, leaving the pilot with little or no time to spare. This additional effort, at an already busy time, is quite undesirable.

Consequently, there exists a need for improved methods and apparatuses for effecting the selection of flight legs into which waypoints can be inserted into a flight plan in a flight management system.

SUMMARY OF THE INVENTION

It is an object of the present invention to provide an improved avionics FMS.

It is a feature of the present invention to include an automatic leg selection feature.

It is another feature of the present invention to include a leg selection feature which is accomplished through a graphical selection of a waypoint on an FMS map.

It is an advantage of the present invention to reduce pilot workload.

The present invention is an apparatus and method for selecting a flight plan leg into which a new waypoint can be inserted, which is designed to satisfy the aforementioned needs, provide the previously stated objects, include the above-listed features, and achieve the already articulated advantages. The present invention is carried out in a "textual list-less" manher in a sense that the undesirable requirement to select a flight plan leg from a textual list has been eliminated for this insert operation.

Accordingly, the present invention is an avionics FMS display having a graphical flight plan leg selection feature which includes an automatic leg suggestion feature.

BRIEF DESCRIPTION OF THE DRAWINGS

The invention may be more fully understood by reading the following description of the preferred embodiments of the invention, in conjunction with the appended drawings wherein.

DETAILED DESCRIPTION

Figure 1:
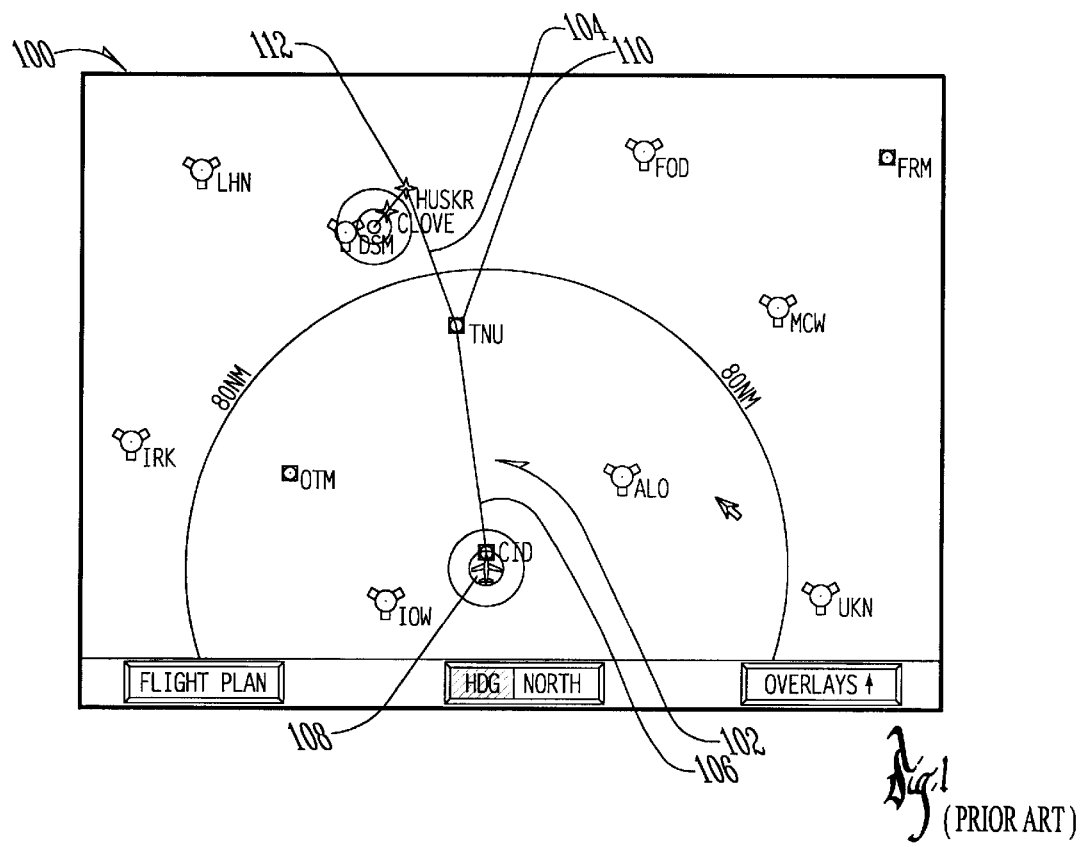
FIG. 1 is a representation of an avionics display of the prior art, showing an FMS map having a two-legged flight plan.

Now referring to the drawings wherein like numerals refer to like matter throughout, there is shown in FIG. 1 a display of the prior art, generally designated 100, having a flight plan 102, with two legs. A final leg 104 and a first leg 106 are shown extending between origination point 108 and termination point 112 with an intermediate point 110 therebetween.

Figure 2:
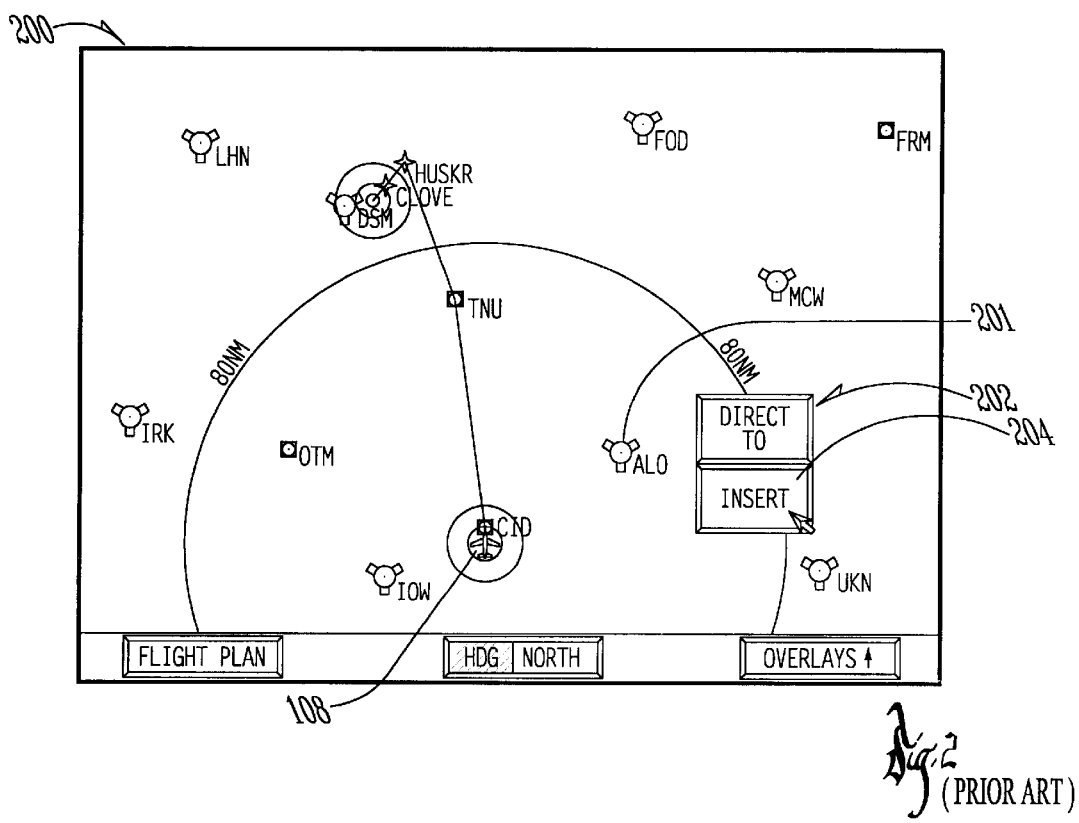
FIG. 2 is a representation of an avionics display of the prior art, showing a pop-up menu having an insert feature.

Now referring to FIG. 2, there is shown a display of FIG. 1 after selecting the waypoint 201 labeled ALO. A pop-up menu 202 has appeared to give the pilot an option of inserting the waypoint 201 into the flight plan by clicking the insert button 204.

Figure 3:
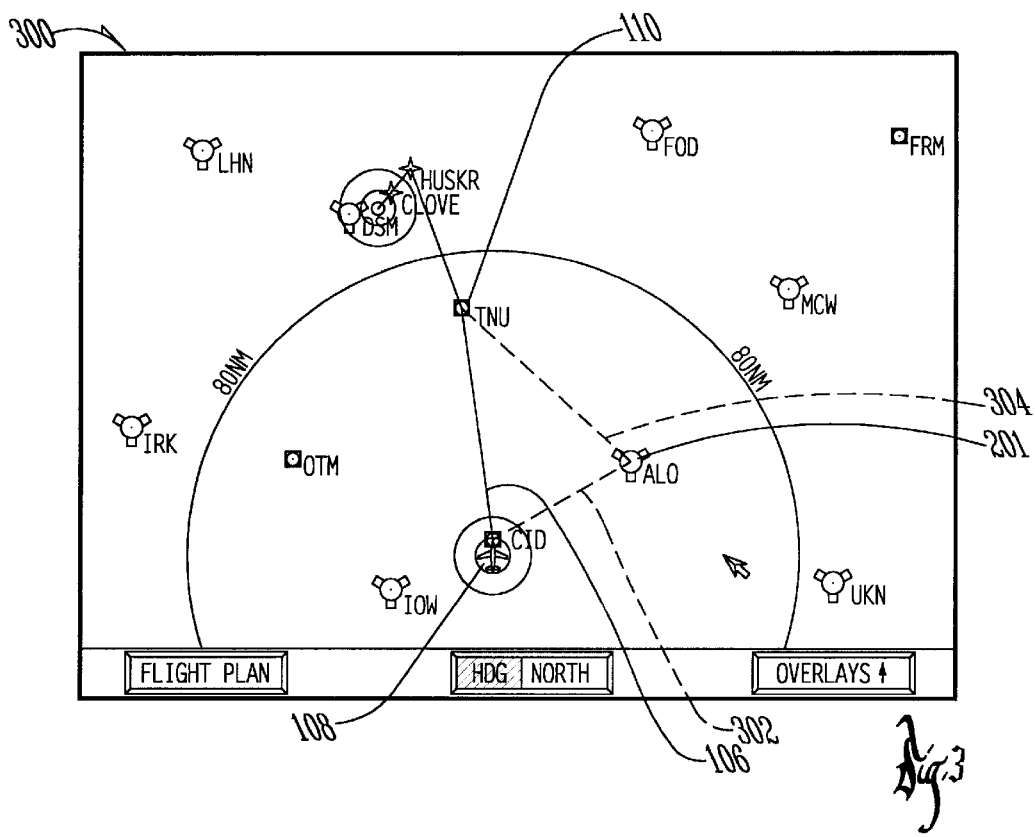
FIG. 3 is a representation of an avionics display of the present invention, showing, in dotted lines, an automatically drawn suggested flight plan adjustment.

Now referring to FIG. 3, there is shown a display of the present invention, generally designated 300, which results from clicking the insert button 204 of FIG. 2. FIG. 3 shows an automatically calculated waypoint insertion scheme, where the newly inserted waypoint 201 is shown to be inserted in first leg 106. A proposed first new leg 302, which extends from origination point 108 to waypoint 201, is shown, together with a proposed intermediate leg 304, which extends from waypoint 201 to intermediate point 110. The FMS automatically generates the new legs 302 and 304 based upon a predetermined criteria. This dotted line is programmed to be a "rubber line", which snaps lines from the waypoint to the end points of whatever flight plan leg is nearest the cursor on the displayed map at any given time. If the cursor were to move so that it is closer to final leg 104 than to first leg 106, then the "rubber line" will automatically (i.e. without requiring further pilot interaction) snap new lines from the waypoint to endpoints of final leg 104 and thereby generate a new proposed flight plan. This automatic selection of the leg into which the new waypoint is inserted, takes advantage of two important factors: 1) the statistical fact that most pilots fly routes such that newly added waypoints are inserted into the closest flight plan legs; and 2) once the waypoint has been selected, the FMS is then capable of calculating the location of the closest flight plan leg.

Figure 4:
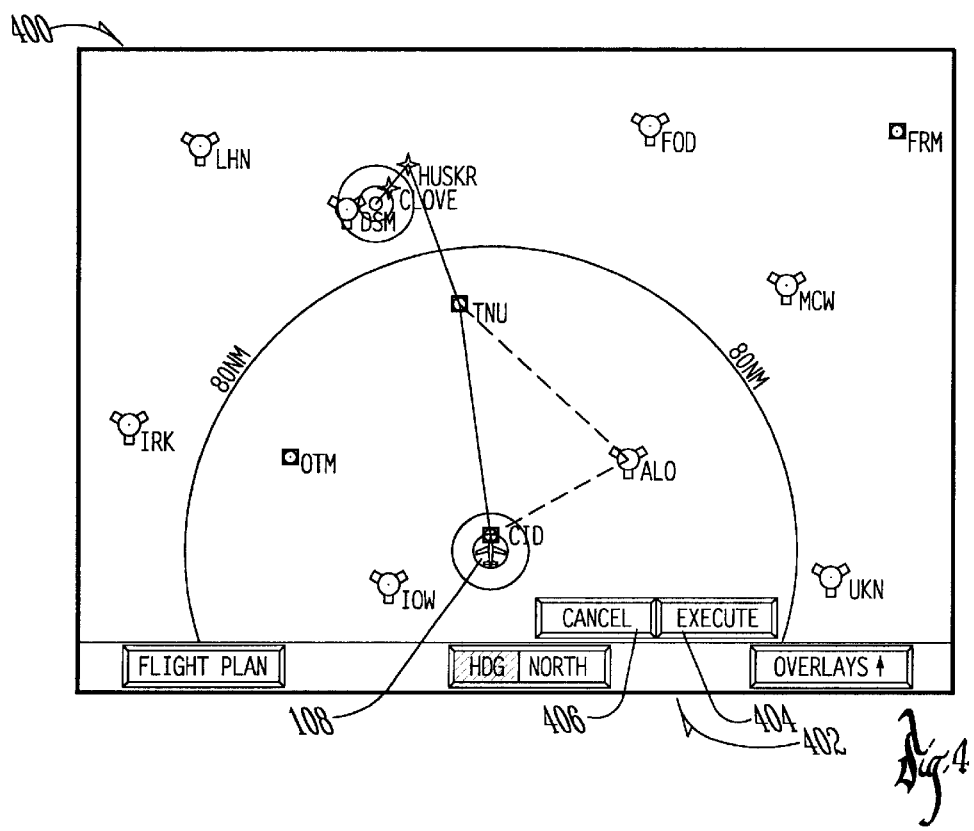
FIG. 4 is a representation of an avionics display of the present invention, showing the pop-up menu giving the pilot the option to execute or cancel the automatically drawn flight plan of FIG. 3.

Now referring to FIG. 4, there is shown a display of the present invention, generally designated 400, which is the result of a single click from FIG. 3. FIG. 4 shows a confirmation window 402 having an execute button 404 and a cancel button 406. Clicking the appropriate button will inform the FMS on whether to adjust the flight plan or not. This process eliminates the need for the pilot to search for and select, from a textual list, the flight leg into which the way point is to be inserted. This is not a trivial enhancement. During times of high turbulence and high pilot workload (take-offs and approaches), the elimination of but a single step may be of tremendous value.

The hardware and software to create the displays of the present invention are either well known in the art or could be adapted, without undue experimentation, from well-known hardware and software, by persons having ordinary skill in the art, once they have carefully reviewed the description of the present invention included herein.

Throughout this description a pilot is described as the operator of the system. This is merely exemplary, and it should be understood that other persons associated with planning a flight, whether they pilot the aircraft or whether they are either on or off the aircraft, are capable of operating the present invention. The use of "pilot" is, therefore, not intended to limit the invention to merely pilots.

It is thought that the method and apparatus of the present invention will be understood from the foregoing description and that it will be apparent that various changes may be made in the form, construct steps, and arrangement of the parts and steps thereof, without departing from the spirit and scope of the invention or sacrificing all of their material advantages. The form herein described is merely a preferred exemplary embodiment thereof.

I claim:

1. An avionics system comprising:
   an FMS computer;
   a display coupled with said FMS computer for displaying FMS information including a graphical depiction of a flight plan, said flight plan including a first waypoint, a second waypoint, and a third waypoint, wherein the first and second waypoints are connected by a first preexisting flight leg and the second and third waypoints are connected by a second preexisting flight leg;
   a cursor controller, for controlling a cursor shown on said display, said cursor controller coupled with said FMS computer and said display;
   a potential waypoint displayed on said display as a spatial point; and
       said potential waypoint coupled to said FMS computer through a graphical user interface, such that a selection of said potential waypoint results in a generation, by a processor, and a display of
           a first possible flight leg and a second possible flight leg if a user-selected position of the cursor is nearer to the first preexisting flight leg than to the second preexisting flight leg, wherein the first possible flight leg extends between the first waypoint and the potential waypoint, and the second possible flight leg extends between the potential waypoint and the second waypoint, and
           a third possible flight leg and a fourth possible flight leg if the user-selected position of the cursor is nearer to the second preexisting flight leg than to the first preexisting flight leg, wherein the third possible flight leg extends between the second waypoint and the potential waypoint, and the fourth possible flight leg extends between the potential waypoint and the third waypoint.

2. An avionics system of claim 1 wherein said selection of said waypoint is accomplished by moving a cursor over said potential waypoint displayed as a spatial point.

3. An avionics system of claim 2 wherein said selection of said waypoint is accomplished by clicking on said potential waypoint displayed as a spatial point.

4. An avionics system of claim 1 wherein said processor is coupled to said display.

5. An avionics system of claim 1 wherein said processor is coupled to said FMS computer.

6. An avionics system of claim 1 wherein at least one of said first, second, third, and fourth possible flight legs is confirmed and entered into said FMS computer by generating a confirmation signal.

7. An apparatus for planning an aircraft flight comprising:
   means for managing flight information;
   means for displaying information in graphic map formats on an aircraft, said information including a graphical depiction of a flight plan, said flight plan including a first waypoint, a second waypoint, and a third waypoint, wherein the first and second waypoints are connected by a first preexisting flight leg and the second and third waypoints are connected by a second preexisting flight leg;
   means for controlling a cursor on said means for displaying;
   means for automatically generating and graphically displaying
       a first possible flight leg and a second possible flight leg if a user-selected position of the cursor is nearer to the first preexisting flight leg than to the second preexisting flight leg, wherein the first possible flight leg extends between the first waypoint and the potential waypoint, and the second possible flight leg extends between the potential waypoint and the second waypoint, and
       a third possible flight leg and a fourth possible flight leg if the user-selected position of the cursor is nearer to the second preexisting flight leg than to the first preexisting flight leg, wherein the third possible flight leg extends between the second waypoint and the potential waypoint, and the fourth possible flight leg extends between the potential waypoint and the third waypoint.

8. An apparatus of claim 7 wherein said means for automatically generating includes a programmed computer processor.

9. An apparatus of claim 7 wherein said means for managing flight information is an FMS.

10. An apparatus of claim 9 wherein said means for automatically generating includes a programmed computer processor.

11. A method of inserting a potential waypoint into a flight plan, said flight plan including a first waypoint, a second waypoint, and a third waypoint, wherein the first and second waypoints are connected by a first preexisting flight leg and the second and third waypoints are connected by a second preexisting flight leg, the method comprising:

selecting the potential waypoint;

graphically displaying, on a display, the flight plan and the potential waypoint, the potential waypoint being displayed as a spatial point;

detemining which of the first and second preexisting flight legs is closet to a user-selected position of a cursor on the display;

displaying a first possible flight leg and a second possible flight leg if the user-selected position of the cursor is nearer to the first preexisting flight leg than to the second preexisting flight leg, wherein the first possible flight leg extends between the first waypoint and the potential waypoint, and the second possible flight leg extends between the potential waypoint and the second waypoint; and displaying a third possible flight leg and a fourth possible flight leg if the user-selected position of the cursor is nearer to the second preexisting flight leg than to the first preexisting flight leg, wherein the third possible flight leg extends between the second waypoint and the potential waypoint, and the fourth possible flight leg extends between the potential waypoint and the third waypoint.

12. The method of claim 11 further comprising:

accepting a user input that indicates whether one of the first and second possible flight legs and the third and fourth possible flight legs are to be inserted into the flight plan;

replacing the first preexisting flight leg with the first and second possible flight legs if the user input so indicates; and replacing the second preexisting flight leg with the third and fourth possible flight legs if the user input so indicates.

\* \* \* \* \*